United States Patent
Englund

(10) Patent No.: US 12,060,927 B2
(45) Date of Patent: Aug. 13, 2024

(54) DIFFERENTIAL GEAR ASSEMBLY, A VEHICLE COMPRISING A DIFFERENTIAL GEAR ASSEMBLY, AND A METHOD FOR ASSEMBLING PARTS OF A DIFFERENTIAL GEAR ASSEMBLY

(71) Applicants: Ningbo Geely Automobile Research & Development Co., Ltd., Ningbo (CN); Zhejiang Geely Holding Group Co., Ltd., Zhejiang (CN)

(72) Inventor: Fredrik Englund, Trollhättan (SE)

(73) Assignees: Ningbo Geely Automobile Research &Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 0 days.

(21) Appl. No.: 18/210,346

(22) Filed: Jun. 15, 2023

(65) Prior Publication Data
US 2023/0323936 A1    Oct. 12, 2023

Related U.S. Application Data

(63) Continuation of application No. PCT/CN2021/137859, filed on Dec. 14, 2021.

(30) Foreign Application Priority Data

Dec. 18, 2020  (EP) ..................... 20215297

(51) Int. Cl.
*F16H 48/38* (2012.01)
*F16H 48/08* (2006.01)

(52) U.S. Cl.
CPC ............. *F16H 48/08* (2013.01); *F16H 48/38* (2013.01); *F16H 2048/085* (2013.01);
(Continued)

(58) Field of Classification Search
CPC .... F16H 48/08; F16H 48/38; F16H 2048/087; F16H 48/40; F16H 2048/085; F16H 2048/382; F16H 2048/385
See application file for complete search history.

(56) References Cited

U.S. PATENT DOCUMENTS 2,873,622 A    2/1959  Nash
6,146,304 A *  11/2000 Bendtsen ................ F16H 48/08
                                                  475/230
(Continued)

FOREIGN PATENT DOCUMENTS

CN    1532436 A    9/2004
CN    2791368 Y    6/2006
(Continued)

OTHER PUBLICATIONS

International Search Report from corresponding International Application No. PCT/CN2021/137859, mailed on Mar. 11, 2022, 3 pages.

*Primary Examiner* — Sherry L Estremsky
(74) *Attorney, Agent, or Firm* — Tucker Ellis LLP

(57) ABSTRACT

A differential gear assembly for a vehicle includes: an annular ring gear having internal and external surfaces, and rotates around a rotational axis extending in an axial direction; first and second side gears respectively distribute a first and second output torque to first and second drive shafts; first and second differential pinion gears respectively engage the first and second side gears; a pinion pin extends diametrically across the ring gear, where the first and second differential pinion gears are rotatably arranged on the pinion pin. The ring gear comprises first and second slots for receiving the pinion pin, where the slots are arranged in connection to the internal surface and extend partly through the ring gear in the axial direction.

13 Claims, 12 Drawing Sheets

(52) U.S. Cl.
 CPC .. *F16H 2048/087* (2013.01); *F16H 2048/382* (2013.01); *F16H 2048/385* (2013.01)

(56) References Cited

U.S. PATENT DOCUMENTS

| | | | |
|---|---|---|---|
| 6,623,396 | B2 | 9/2003 | Szalony |
| 6,652,408 | B2 * | 11/2003 | Rutt ........................ F16H 48/08 |
| | | | 74/423 |
| 6,945,898 | B2 * | 9/2005 | Szuba .................... F16H 48/08 |
| | | | 475/230 |
| 7,695,392 | B2 * | 4/2010 | Isken, II .................. F16H 48/22 |
| | | | 74/606 R |
| 11,441,656 | B2 * | 9/2022 | Loeffelmann ........... F16H 48/38 |
| 2003/0064851 | A1 | 4/2003 | Orr |
| 2003/0109350 | A1 | 6/2003 | Rutt |
| 2003/0144106 | A1 | 7/2003 | Szalony |
| 2009/0017962 | A1 | 1/2009 | Isken, II |
| 2009/0305835 | A1 | 12/2009 | Sudorowski |
| 2017/0089440 | A1 | 3/2017 | Shirakawa |

FOREIGN PATENT DOCUMENTS

| | | | |
|---|---|---|---|
| CN | 102979880 A | | 3/2013 |
| CN | 106979307 A | | 7/2017 |
| CN | 107667235 A | | 2/2018 |
| DE | 102018124491 A1 | | 4/2020 |
| GB | 329170 A | | 5/1930 |
| GB | 1148269 A | | 4/1969 |
| GB | 1252520 A | * | 11/1971 |
| GB | 2391276 A | | 2/2004 |
| JP | 2020148294 A | | 9/2020 |
| WO | 2016207634 A1 | | 12/2016 |

* cited by examiner

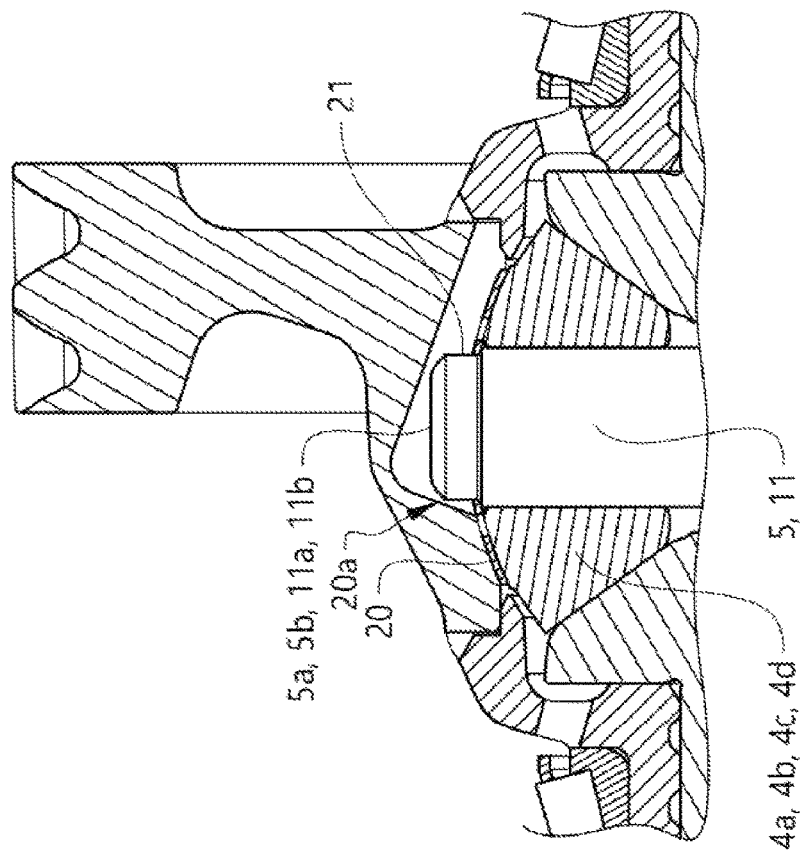
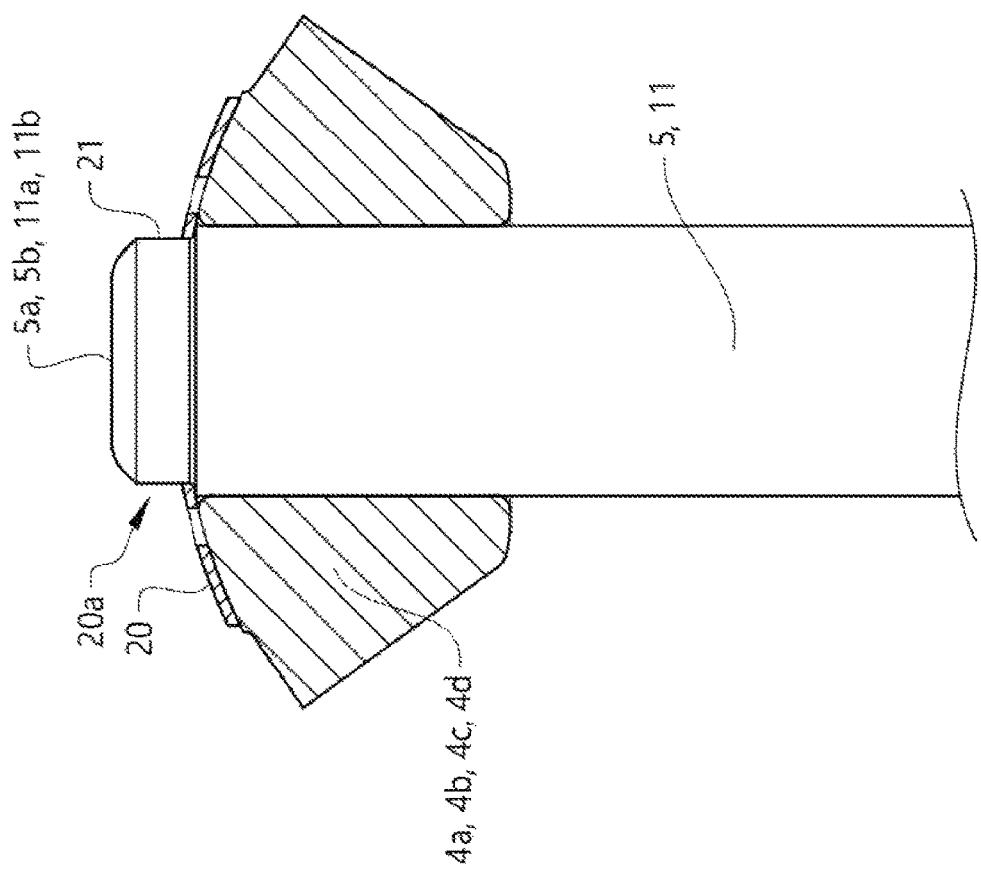

DIFFERENTIAL GEAR ASSEMBLY, A VEHICLE COMPRISING A DIFFERENTIAL GEAR ASSEMBLY, AND A METHOD FOR ASSEMBLING PARTS OF A DIFFERENTIAL GEAR ASSEMBLY

RELATED APPLICATION DATA

This application is a continuation of International Patent Application No. PCT/CN2021/137859, filed Dec. 14, 2021, which claims the benefit of European Patent Application No. 20215297.1, filed Dec. 18, 2020, the disclosures of which are incorporated herein by reference in their entireties.

TECHNICAL FIELD

The present disclosure relates to a differential gear assembly for a vehicle. The differential gear assembly comprises an annular ring gear having an internal surface and an external surface, where the ring gear is arranged to rotate around a rotational axis extending in an axial direction. A first side gear is configured for distributing a first output torque to a first drive shaft, and a second side gear is configured for distributing a second output torque to a second drive shaft. A first differential pinion gear and a second differential pinion gear are configured for engaging the first side gear and the second side gear. A pinion pin is extending diametrically across the ring gear, where the first differential pinion gear and the second differential pinion gear are rotatably arranged on the pinion pin. The disclosure further relates to a vehicle comprising a differential gear assembly, and a method for assembling parts of a differential gear assembly.

BACKGROUND

Differential gear assemblies are commonly used in vehicle applications for transferring torque from a rotating input drive shaft to axles and wheels of a vehicle. Differential gear assemblies may also be used for torque distribution between front wheels and rear wheels in four-wheel drive systems. The rotating input drive shaft is traditionally engaging a ring gear connected to a differential housing, and the differential gear assembly is arranged to transfer torque from the input drive shaft to output drive shafts via the ring gear, differential pinion gears and side gears. Typically, a pair of side gears are directly attached to the output drive shafts, and a pair of differential pinion gears are interconnecting the side gears. The differential pinion gears are supported by a pinion pin, which normally extends across the differential housing. The differential pinion gears are allowed to rotate on the pinion pin, allowing the vehicle output drive shafts to rotate relative to one another. The rotational load is transferred from the input drive shaft, to the ring gear, through the differential housing and to the pinion pin.

Traditional differential housings are made robust in construction to support the load being transferred through the housing structure. Commonly used designs transfer the torque from the ring gear through a bolted differential housing, which is carrying the drive shaft interfaces. The interfaces require a heavy design with a bulky screw joint in-between to transfer the torque. Manufacturing of the housing requires special tooling with several setups to achieve spherical interfaces to the internal bevel gears. The robustness in construction is commonly making the differential gear assembly unnecessarily heavy in construction. In addition to this, in most conventional differential gear assemblies using helical gears, axial loads are generated. With the conventional unsymmetrical geometry of the gear assemblies, the gear deflection over one revolution is fluctuating. This may cause an unwanted tipping moment and uneven overall gear stiffness through the arrangement of the ring gear and pinion pin in relation to the differential housing, which in turn is causing unwanted NVH (Noise, Vibration, and Harshness), as well as durability and efficiency degradation of the differential gear assembly.

Further, traditional differential gear assemblies are involving many different parts, making them time consuming to assemble.

There is thus a need for an improved differential gear assembly with a more simple and lightweight construction including fewer parts, which assembly also is simple and less time consuming to assemble. Further, the construction should prevent the unwanted problem with NVH.

SUMMARY

An object of the present disclosure is to provide a differential gear assembly, a vehicle comprising a differential gear assembly, and a method for assembling parts of a differential gear assembly, where the previously mentioned problems are avoided.

The disclosure concerns a differential gear assembly for a vehicle. The differential gear assembly comprises: an annular ring gear having an internal surface and an external surface, where the ring gear is arranged to rotate around a rotational axis extending in an axial direction; a first side gear configured for distributing a first output torque to a first drive shaft, and a second side gear configured for distributing a second output torque to a second drive shaft; a first differential pinion gear and a second differential pinion gear, where the first differential pinion gear and the second differential pinion gear are configured for engaging the first side gear and the second side gear; a pinion pin extending diametrically across the ring gear, where the first differential pinion gear and the second differential pinion gear are rotatably arranged on the pinion pin. The ring gear comprises a first slot and a second slot configured for receiving the pinion pin, where the first slot and the second slot are arranged in connection to the internal surface and extending partly through the ring gear in the axial direction.

Advantages with these features are that the differential gear assembly is simple and lightweight in construction, which may be manufactured and assembled without the need for special tooling. This design makes it possible to align the ring gear centre in the centre area of the pinion pin, without any conflict with a conventional screw flange used in traditional differential gear assemblies. The differential gear assembly with this configuration can be made with fewer parts compared to traditional constructions, which in turn is making the assembling of the differential gear assembly simple and less time consuming. Further, the construction can be made rotation symmetric or close to rotation symmetric, and the deflection over a revolution therefore becomes close to uniform, which prevents degradations in NVH, durability, and efficiency.

According to an aspect of the disclosure, the ring gear comprises a first side wall and a second side wall arranged on opposite sides of the ring gear in the axial direction, where the first side wall and the second side wall each is connecting the internal surface and the external surface. The first slot comprises a first slot opening configured for receiving a first end of the pinion pin, and the second slot comprises a second slot opening configured for receiving a second end of the pinion pin. The first slot opening is arranged in connection to the first side wall and the second slot opening is arranged in connection to the second side wall. The arrangement of the slots towards different side walls is simplifying the assembly of the pinion pin, since the pinion pin can be rotated into an operating position of the differential gear assembly.

According to another aspect of the disclosure, the pinion pin when received in the first slot and the second slot in an operating position is extending perpendicular to the axial direction. The alignment and positioning of the pinion pin is simplified through the arrangements of the respective slots.

According to an aspect of the disclosure, the differential gear assembly further comprises: a third differential pinion gear and a fourth differential pinion gear, where the third differential pinion gear and the fourth differential pinion gear are configured for engaging the first side gear and the second side gear; and a supplemental pinion pin extending diametrically across the ring gear. The third differential pinion gear and the fourth differential pinion gear are rotatably arranged on the supplemental pinion pin. The ring gear comprises a third slot and a fourth slot configured for receiving the supplemental pinion pin. The third slot and the fourth slot are arranged in connection to the internal surface and extending partly through the ring gear in the axial direction. The additional differential pinion gears can be used for an alternative construction of the differential gear assembly that is providing an efficient torque transfer for higher torque loads.

According to another aspect of the disclosure, the third slot comprises a third slot opening configured for receiving a first end of the supplemental pinion pin, and the fourth slot comprises a fourth slot opening configured for receiving a second end of the supplemental pinion pin. The third slot opening is arranged in connection to the second side wall and the fourth slot opening is arranged in connection to the first side wall. The arrangement of the slots towards different side walls is simplifying the assembly of the supplemental pinion pin, where the supplemental pinion pin can be rotated into an operating position of the differential gear assembly.

According to an aspect of the disclosure, the supplemental pinion pin when received in the third slot and the fourth slot in an operating position has an extension perpendicular to the axial direction. The alignment and positioning of the supplemental pinion pin is simplified through the arrangements of the respective slots.

According to another aspect of the disclosure, the supplemental pinion pin comprises a first pin section and a second pin section connected by a pin section holder. The arrangement with the pin sections and the pin section holder is simplifying the assembly of the differential gear assembly.

According to a further aspect of the disclosure, the pin section holder is connected to the pinion pin and configured for positioning the first pin section and the second pin section on radially opposite sides of the pinion pin. The pin sections are held in position relative to the pinion pin through the arrangement with the pin section holder, for a simple and efficient construction.

According to an aspect of the disclosure, each slot has an inclined configuration and arranged at a slot angle in relation to the axial direction. With the inclined slot configuration, the pinion pin and the supplemental pinion pin can be assembled with rotating or turning manoeuvres into their respective positions. The inclined slot configuration is thus simplifying a rotational positioning of the pinion pin and the supplemental pinion pin into the respective slots. The slots can also be arranged with an arc-shaped configuration following the path of the rotational assembly manoeuvres of the pinion pin and supplemental pinion pin during the assembling operation. The pinion pin and the supplemental pinion pin may be arranged with surfaces configured for matching the slots, such as flat surfaces preventing rotation of the pinion pin in relation to the ring gear, in combination with inclined surfaces for restraining a centre positioning in relation to the slots.

According to another aspect of the disclosure, the differential gear assembly further comprises a first bearing flange arranged in connection to the second side wall and a second bearing flange arranged in connection to the first side wall. The first bearing flange, the second bearing flange, and the interior surface, are configured for enclosing the side gears. The bearing flanges are keeping lubrication in place and are arranged for holding bearings. The bearing flanges together with the side gears are further used for holding the pinion pin and the supplemental pinion pin in position in relation to the slots. The inclined configuration of the slots is further enabling bearing flanges with smaller diameters for a more lightweight construction.

According to a further aspect of the disclosure, the first bearing flange and the second bearing flange are symmetrical in shape. The symmetrical shape is providing a cost efficient and simple construction of the differential gear assembly.

According to an aspect of the disclosure, the first bearing flange and the second bearing flange each is connected to the ring gear with one or more welds. The welds are efficiently attaching the bearing flanges to the ring gear for a strong and lightweight construction with few components involved.

According to another aspect of the disclosure, the side gears and the differential pinion gears are positioned radially inside the ring gear. The pinion pin is configured for transferring input torque from the ring gear to the side gears via the differential pinion gears for an efficient torque distribution. Alternatively, the pinion pin and the supplemental pinion pin are configured for transferring input torque from the ring gear to the side gears via the differential pinion gears for an efficient torque distribution.

The disclosure further concerns a vehicle comprising a differential gear assembly as described above.

The disclosure further concerns a method for assembling parts of a differential gear assembly. The method comprises the steps: rotatably arranging the first differential pinion gear and the second differential pinion gear on the pinion pin; positioning the pinion pin with the first differential pinion gear and the second differential pinion gear inside the ring gear; rotating the pinion pin with the first differential pinion gear and the second differential pinion gear into an operating position in which the pinion pin is received in the first slot and the second slot for a torque transferring engagement between the ring gear and the pinion pin. With these features, the differential gear assembly is simple and lightweight in construction and can be assembled without the need for special tooling. The differential gear assembly with this configuration can be made with fewer parts compared to traditional constructions, which in turn is making the assembling of the differential gear assembly simple and less time consuming. The rotating of the pinion pin with the first differential pinion gear and the second differential pinion gear into the operating position in the first slot and the second slot is simplifying the assembly of the differential gear assembly.

BRIEF DESCRIPTION OF THE DRAWINGS

The disclosure will be described in detail in the following, with reference to the attached drawings, in which

FIGS. 5A-5B show schematically in cross-sectional side views, a section of the differential gear assembly with a washer structure, according to alternative embodiments of the disclosure.

DETAILED DESCRIPTION OF EXAMPLE EMBODIMENTS

Figure 1:
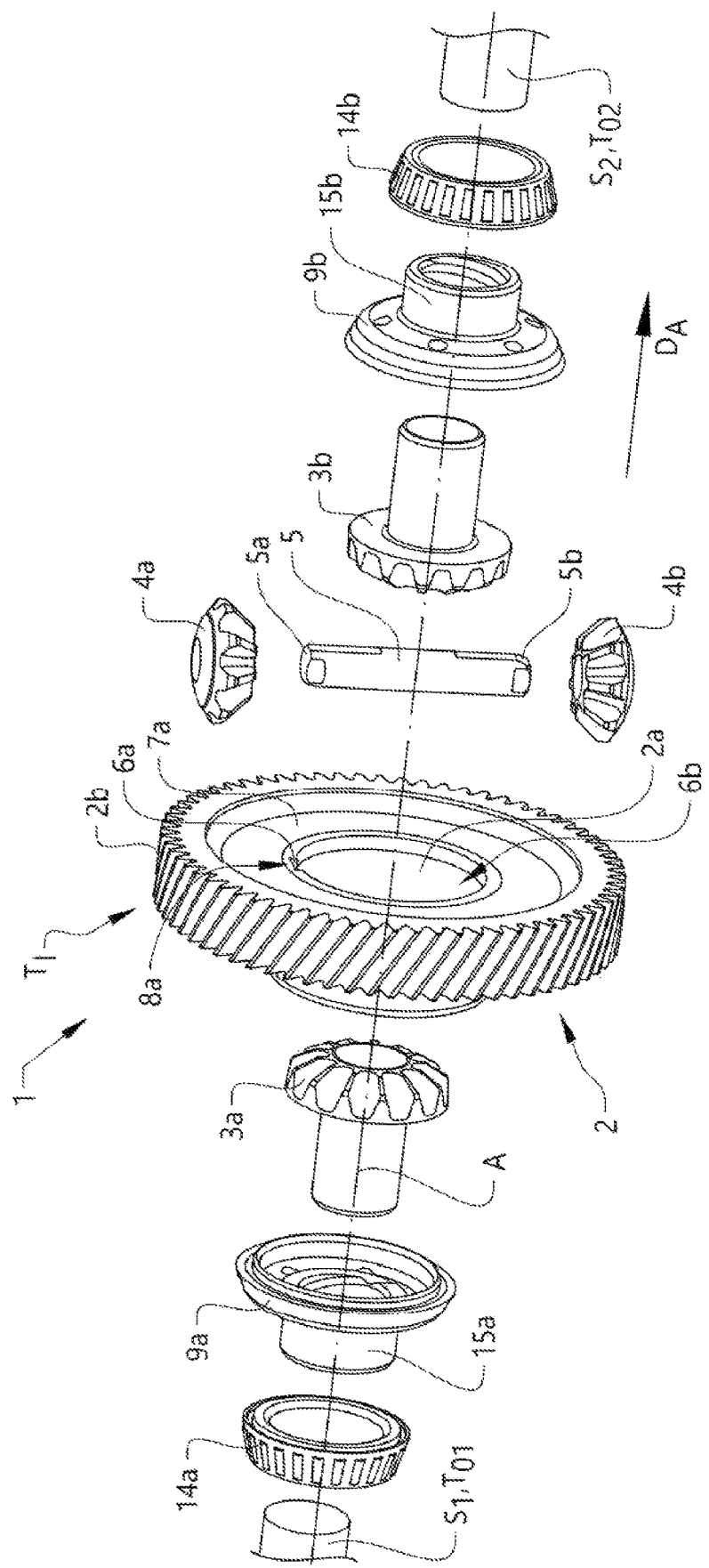
FIG. 1 shows in an exploded perspective view, a differential gear assembly according to the disclosure.

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

FIGS. 1 and 2A-2E schematically show a differential gear assembly 1 for a vehicle. The differential gear assembly 1 comprises an annular ring gear 2 having an internal surface 2a and an external surface 2b. The ring gear 2 is arranged to rotate around a rotational axis A extending in an axial direction $D_A$. The external surface 2b is in the illustrated embodiment arranged as a toothed surface for driving engagement with a non-illustrated rotating input drive shaft, where the toothed surface of the ring gear 2 is meshing with a toothed surface of for example an input drive shaft pinion gear. In alternative embodiments, the toothed surface may instead be arranged on other parts of the ring gear 2.

The differential gear assembly 1 of the illustrated embodiment further comprises side gears and differential pinion gears of the bevel gear type. A first side gear 3a is configured for distributing a first output torque $T_{O1}$ to a first drive shaft $S_1$, and a second side gear 3b is configured for distributing a second output torque $T_{O2}$ to a second drive shaft $S_2$. The first side gear 3a and the second side gear 3b are arranged on opposite sides of the ring gear 2 in the axial direction $D_A$. A first differential pinion gear 4a and a second differential pinion gear 4b are configured for engaging the first side gear 3a and the second side gear 3b. The differential pinion gears are as illustrated in the figures in a conventional manner arranged with toothed surfaces that are engaging toothed surfaces of the side gears. A pinion pin 5 is attached to and extending diametrically across the ring gear 2 and the pinion pin 5 is arranged for transferring torque from the ring gear 2 to the respective differential pinion gears. The first differential pinion gear 4a and the second differential pinion gear 4b are rotatably arranged on the pinion pin 5, and the differential pinion gears are transferring torque from the ring gear 2 to the side gears. Upon rotation of the ring gear 2 by for example the input drive shaft pinion gear, the pinion pin 5 is through the attachment to the ring gear 2 rotating with the ring gear 2. The rotational movement of the pinion pin 5 with the ring gear 2 is used for transferring the torque to the first side gear 3a and the second side gear 3b via the first differential pinion gear 4a and the second differential pinion gear 4b. With the configuration of the differential gear assembly 1, the side gears and the differential pinion gears are positioned radially inside the ring gear 2 in an operating position $P_O$ of the differential gear assembly 1, as schematically illustrated in for example FIG. 2C. The pinion pin 5 is thus configured for transferring an input torque $T_1$ from the ring gear 2 to the side gears via the differential pinion gears.

The ring gear 2 comprises a first side wall 7a and a second side wall 7b arranged on opposite sides of the ring gear 2 in the axial direction $D_A$, as shown in FIGS. 1 and 2A-2E. Each of the first side wall 7a and the second side wall 7b is connecting the internal surface 2a and the external surface 2b.

Figure 2A:
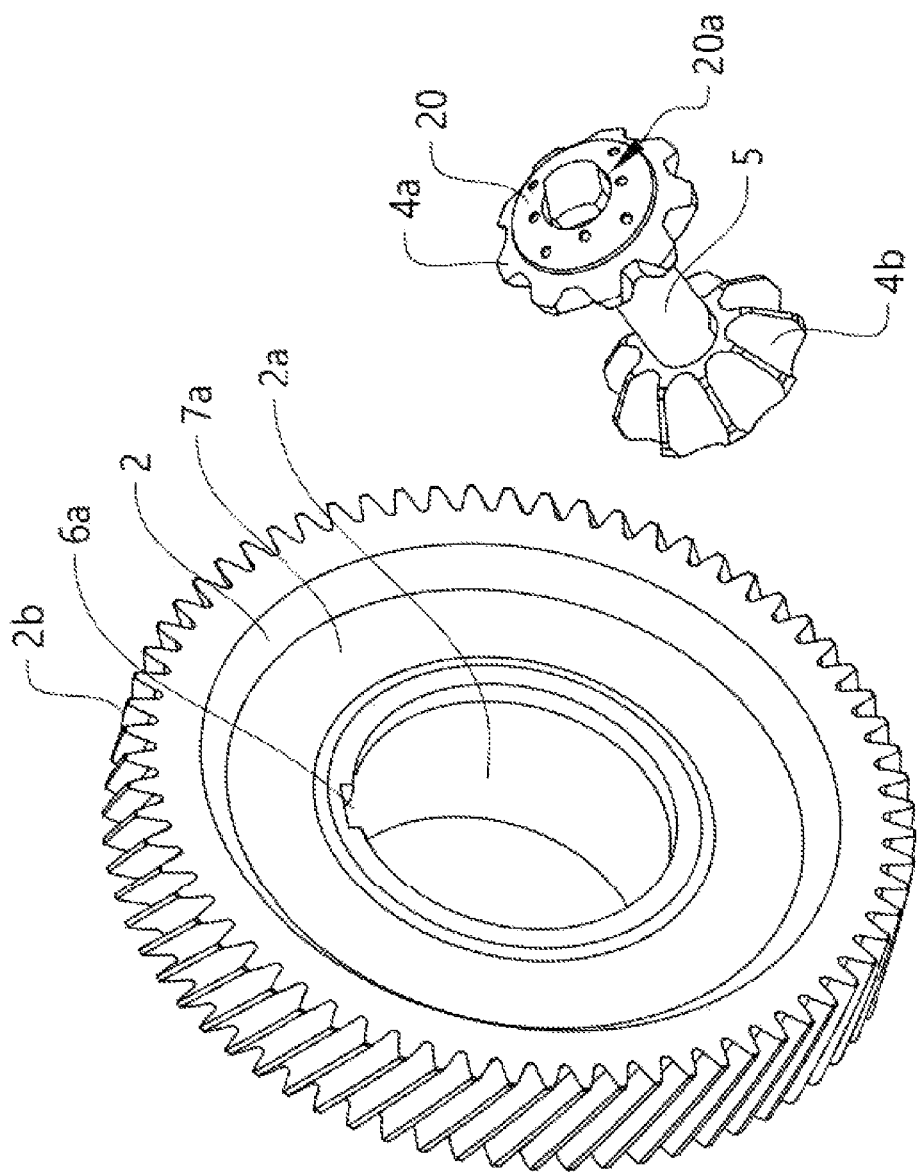
FIGS. 2A-2E show schematically in perspective views, cross-sectional side views, and an exploded perspective view, the differential gear assembly according to the disclosure.
Figure 2C:
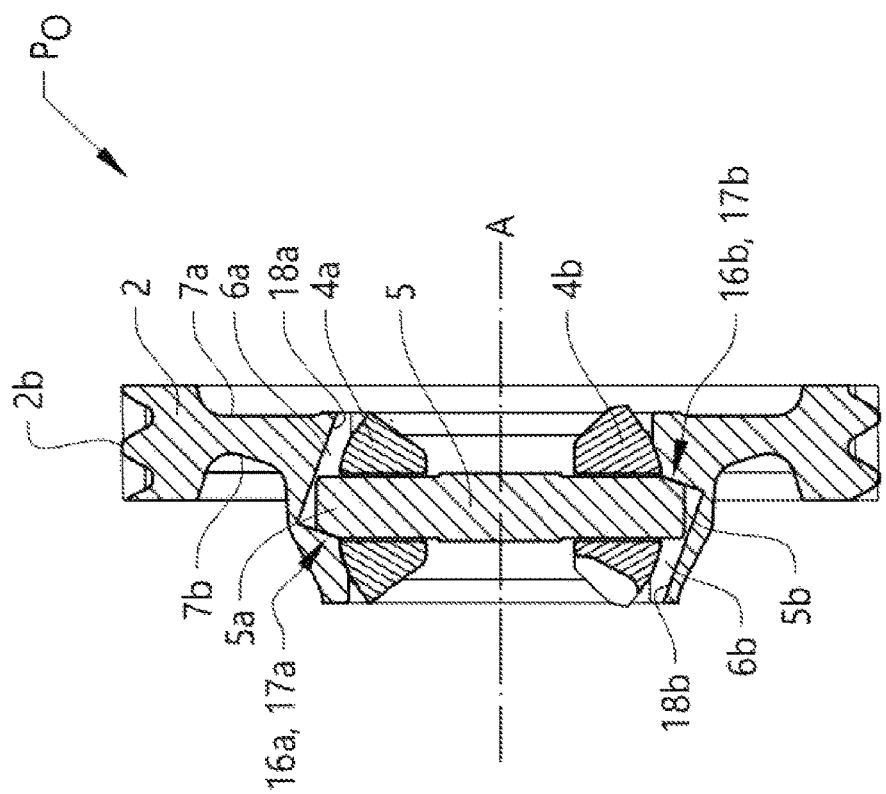
Figure 2B:
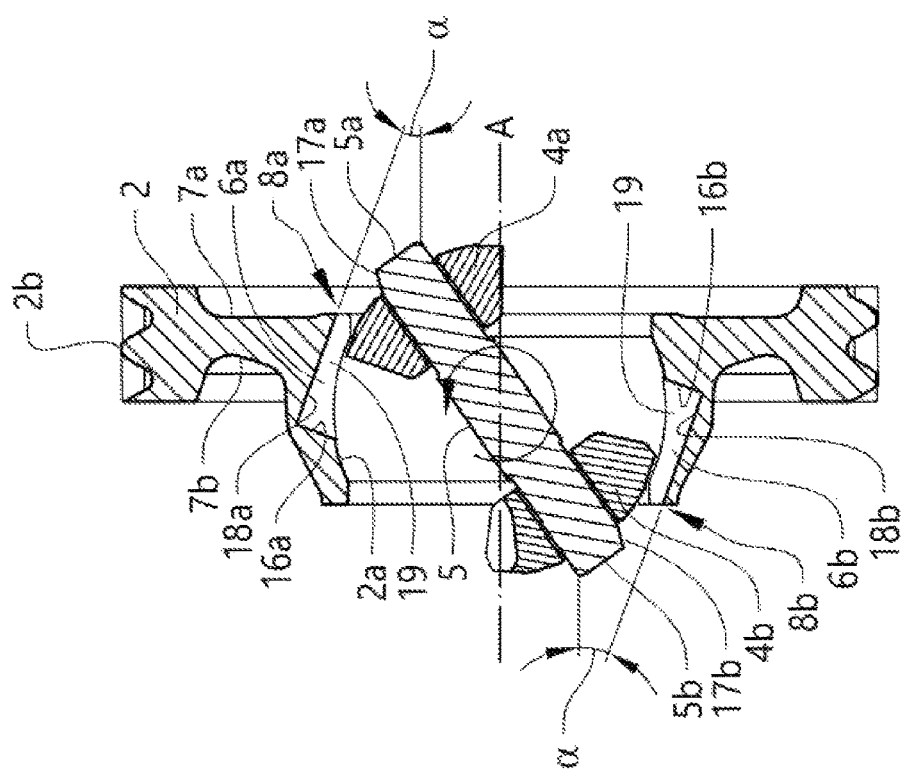

As illustrated in FIGS. 1 and 2A-2D, the ring gear 2 comprises a first slot 6a and a second slot 6b configured for receiving the pinion pin 5. The first slot 6a and the second slot 6b are arranged in connection to the internal surface 2a, and the first slot 6a and the second slot 6b are extending partly through the ring gear 2 in the axial direction $D_A$, as best shown in FIGS. 2B-2C. The first slot 6a is extending in the axial direction $D_A$ from the first side wall 7a partly through the ring gear 2, where the extension from the first side wall 7a is forming a recess in the material of the ring gear 2 in connection to the internal surface 2a. The second slot 6b is extending in the axial direction $D_A$ from the second side wall 7b partly through the ring gear, where the extension from the second side wall 7b is forming a recess in the material of the ring gear 2 in connection to the internal surface 2a. As shown in the figures, the first slot 6a is arranged in connection to the interior surface 2a and the first side wall 7a, and the second slot 6b is arranged in connection to the interior surface 2b and the second side wall 7b. The first slot 6a and the second slot 6b are arranged diametrically opposite each other with respect to the ring gear 2, as understood from FIGS. 2B-2C. The first slot 6a and the second slot 6b are thus spaced apart with an angle of 180° relative to the extension of the inner periphery of the ring gear 2 formed of the interior surface 2a.

The first slot 6a comprises a first slot opening 8a configured for receiving a first end 5a of the pinion pin 5, and the second slot 6b comprises a second slot opening 8b configured for receiving a second end 5b of the pinion pin 5, as shown in for example FIGS. 1 and 2B-2C. The first slot opening 8a is arranged in connection to the first side wall 7a and the second slot opening 8b is arranged in connection to the second side wall 7b. The respective slot openings are thus configured for receiving corresponding ends of the pinion pin 5 for a simple assembly of the differential gear assembly 1. As shown in FIG. 2C, in the operating position $P_O$ of the differential gear assembly 1, the first end 5a is received in the first slot 6a and the second end 5b is received in the second slot 6b. As shown in FIGS. 2B-2C, the first slot 6a is arranged with a first inner stop surface 16a, which is in contact with the first end 5a in the operating position $P_O$, for a precise positioning of the pinion pin 5 relative to the ring gear 2. The first end 5a may be provided with a shaped first contact surface 17a that is configured with a shape corresponding to the first inner stop surface 16a for a secure positioning of the pinion pin 5 in relation to the ring gear 2. The second slot 6b is arranged with a second inner stop surface 16b, which is in contact with the second end 5b in the operating position $P_O$, for a precise positioning of the pinion pin 5 to the ring gear 2. The second end 5b may be provided with a shaped second contact surface 17b that is configured with a shape corresponding to the second inner stop surface 16b for a secure positioning of the pinion pin 5 in relation to the ring gear 2. The pinion pin 5 is when received in the first slot 6a and the second slot 6b in the operating position $P_O$ extending perpendicular to, or essentially perpendicular to, the axial direction $D_A$, as shown in FIG. 2C. The first slot 6a is further arranged with a first outer surface 18a, which in the operating position $P_O$ is limiting movement of the pinion pin 5 outwards in the radial direction. The first outer surface 18a is connecting the first slot opening 8a and the first inner stop surface 16a. The second slot 6b is further arranged with a second outer surface 18b, which in the operating position $P_O$ is limiting movement of the pinion pin 5 outwards in the radial direction. The second outer surface 18b is connecting the second slot opening 8b and the second inner stop surface 16b. Each slot is further arranged with two side surfaces 19 extending from the respective outer surfaces to the internal surface 2a of the ring gear 2, as indicated in FIG. 2B. The side surfaces 19 are preventing unwanted movement of the pinion pin 5 in a direction along the inner periphery of the ring gear 2 in connection to the interior surface 2a. Suitably, each slot has a shape and dimension matching the shape and dimension of the corresponding end of the pinion pin 5 for a secure positioning and attachment of the pinion pin 5 relative to the ring gear 2 in the operating position $P_O$.

For a simple and precise assembly and positioning of the pinion pin 5 relative to the ring gear 2, the first slot 6a and the second slot 6b have inclined configurations and arranged at a slot angle α in relation to the axial direction $D_A$. As schematically shown in FIG. 2B, the first slot 6a is arranged at a slot angle α relative to the axial direction $D_A$. The first outer surface 18a of the first slot 6a is configured as an inclined surface that is arranged at the slot angle α in relation to the axial direction $D_A$. The second slot 6b is in a similar way arranged at a slot angle α relative to the axial direction $D_A$. The second outer surface 18b of the second slot 6b is configured as an inclined surface that is arranged at the slot angle α in relation to the axial direction $D_A$. The respective outer surfaces may have a straight configuration, as illustrated in FIGS. 2B-2C, or alternatively a curved or arced configuration, depending on the design of the differential gear assembly 1. In the latter case, where the outer surfaces are having curved or arced configurations, the slot angle α may be determined as the angle between the axial direction $D_A$ and the tangential line to the outer surfaces at the slot openings. With the curved or arced configurations, the arc radius needs to be slightly larger than the radial extension of the pinion pin 5.

Figure 2D:
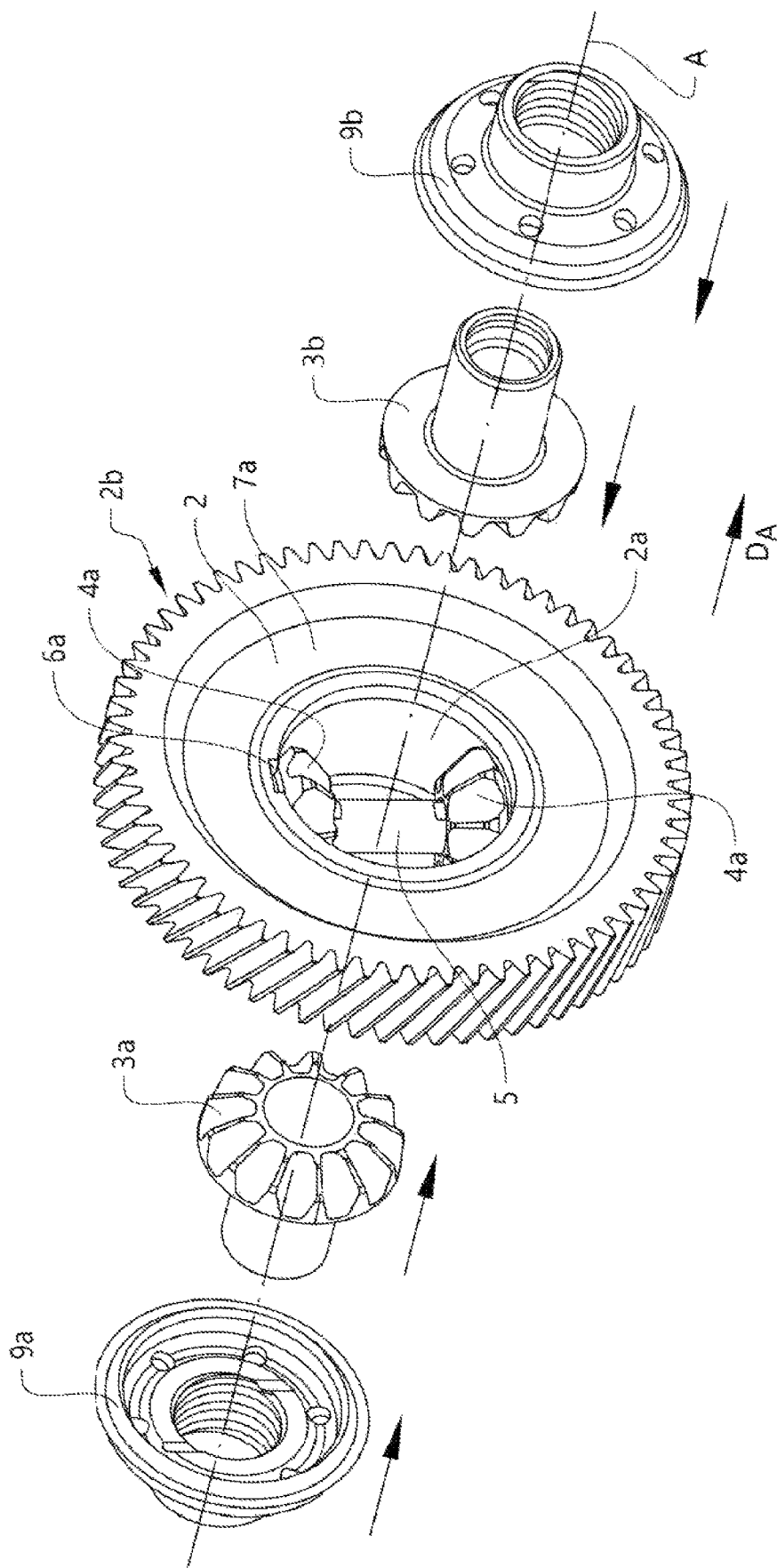
Figure 2E:
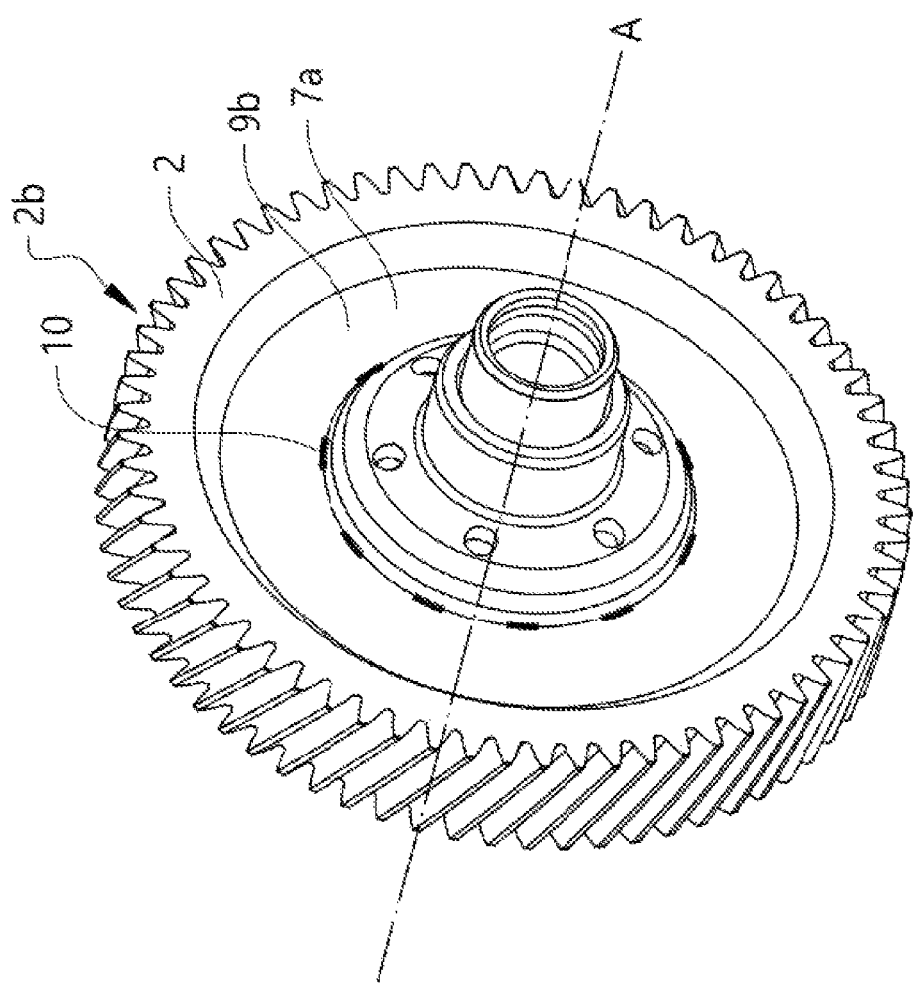

As shown in FIGS. 1 and 2D-2E, the differential gear assembly 1 further comprises a first bearing flange 9a arranged in connection to the second side wall 7b and a second bearing flange 9b arranged in connection to the first side wall 7a. The first bearing flange 9a, the second bearing flange 9b, and the interior surface 2a of the ring gear 2, are configured for enclosing the first side gear 3a, the second side gear 3b, the first differential pinion gear 4a, and the second differential pinion gear 4b. The bearing flanges are arranged as cover structures for keeping lubrication in place and for holding bearings. The bearing flanges are further used for holding the pinion pin and the supplemental pinion pin in position in relation to the slots. The first bearing flange 9a and the second bearing flange 9b may have any suitable configuration, and each bearing flange may be provided with one or more seals in connection to its corresponding side gear. The first bearing flange 9a and the second bearing flange 9b are suitably symmetrical in shape for a cost efficient and simple construction of the differential gear assembly 1. As shown in FIG. 1, the first bearing flange 9a is arranged with a first bearing surface 15a for holding a first bearing 14a. The second bearing flange 9b is arranged with a second bearing surface 15b for holding a second bearing 14b. Each of the first bearing flange 9a and the second bearing flange 9b is suitably connected to the ring gear 2 with one or more welds 10, as schematically illustrated in FIG. 2E. A steeper configuration of the slots with larger slot angles α may be used for enabling smaller outer diameters of the bearing flanges, as understood from the slot configuration illustrated in FIG. 2B. The bearing flanges should suitably cover the slot openings, as shown in FIG. 2E, and with a steeper slot configuration, the radial extensions of the slot openings may be decreased. Smaller outer diameters are enabling a more lightweight design of the bearing flanges.

To assemble parts of the differential gear assembly 1, the components and parts needed are provided from a suitable source. The first differential pinion gear 4a and the second differential pinion gear 4b are rotatably arranged on respective ends of the pinion pin 5 into the position illustrated in FIG. 2A. Thereafter, the pinion pin 5 with the first differential pinion gear 4a and the second differential pinion gear 4b is positioned inside the ring gear 2, as shown in FIG. 2B. The pinion pin 5 with the first differential pinion gear 4a and the second differential pinion gear 4b is rotated into the operating position $P_O$ in which the pinion pin 5 is received in the first slot 6a and the second slot 6b for a torque transferring engagement between the ring gear 2 and the pinion pin 5, as indicated with the arrow in FIG. 2B. The pinion pin 5 with the first differential pinion gear 4a and the second differential pinion gear 4b is thus in the illustrated embodiment rotated counter clockwise from the mounting position in FIG. 2B to the operating position $P_O$ in FIG. 2C. When the pinion pin 5 with the first differential pinion gear 4a and the second differential pinion gear 4b is mounted to the ring gear 2, the first side gear 3a and the second side gear 3b are assembled into the differential gear assembly 1 in positions where the first side gear 3a and the second side gear 3b are in engagement with the first differential pinion gear 4a and the second differential pinion gear 4b, as indicated with arrows in FIG. 2D. The first bearing flange 9a and the second bearing flange 9b are assembled with the first side gear 3a and the second side gear 3b, as indicated with arrows in FIG. 2D to the fully assembled position in FIG. 2E. The first bearing flange 9a and the second bearing flange 9b are thereafter welded to the ring gear 2 with one or more welds 10 as shown in FIG. 2E.

FIGS. 3 and 4A-4F schematically show a differential gear assembly 1 for a vehicle according to an alternative embodiment, where the differential gear assembly 1 instead is arranged with four differential pinion gears. The differential gear assembly 1 comprises an annular ring gear 2 having an internal surface 2a and an external surface 2b. The ring gear 2 is arranged to rotate around a rotational axis A extending in an axial direction $D_A$. The external surface 2b is in the illustrated embodiment arranged as a toothed surface for driving engagement with a non-illustrated rotating input drive shaft, where the toothed surface of the ring gear 2 is meshing with a toothed surface of for example an input drive shaft pinion gear. In alternative embodiments, the toothed surface may instead be arranged on other parts of the ring gear 2.

The differential gear assembly 1 of the illustrated alternative embodiment further comprises side gears and differential pinion gears of the bevel gear type. A first side gear 3a is configured for distributing a first output torque $T_{O1}$ to a first drive shaft $S_1$, and a second side gear 3b is configured for distributing a second output torque $T_{O2}$ to a second drive shaft $S_2$. The first side gear 3a and the second side gear 3b are arranged on opposite sides of the ring gear 2 in the axial direction $D_A$. A first differential pinion gear 4a, a second differential pinion gear 4b, a third differential pinion gear 4c and a fourth differential pinion gear 4d, are configured for engaging the first side gear 3a and the second side gear 3b. The differential pinion gears are as illustrated in the figures in a conventional manner arranged with toothed surfaces that are engaging toothed surfaces of the side gears. A pinion pin 5 is attached to and extending diametrically across the ring gear 2 and a supplemental pinion pin 11 is attached to and extending diametrically across the ring gear 2. The pinion pin 5 and the supplemental pinion pin 11 are arranged for transferring torque from the ring gear 2 to the respective differential pinion gears. The first differential pinion gear 4a and the second differential pinion gear 4b are rotatably arranged on the pinion pin 5. The third differential pinion gear 4c and the fourth differential pinion gear 4d are rotatably arranged on the supplemental pinion pin 11. The differential pinion gears are transferring torque from the ring gear 2 to the side gears. Upon rotation of the ring gear 2 by for example the input drive shaft pinion gear, the pinion pin 5 is through the attachment to the ring gear 2 rotating with the ring gear 2. The rotational movement of the pinion pin 5 and the supplemental pinion pin 11 with the ring gear 2 is used for transferring the torque to the first side gear 3a and the second side gear 3b via the first differential pinion gear 4a, the second differential pinion gear 4b, the third differential pinion gear 4c, and the fourth differential pinion gear 4d. With the configuration of the differential gear assembly 1, the side gears and the differential pinion gears are positioned radially inside the ring gear 2 in an operating position $P_O$ of the differential gear assembly 1, as schematically illustrated in for example FIG. 4C. The pinion pin 5 and the supplemental pinion pin 11 are thus configured for transferring an input torque $T_1$ from the ring gear 2 to the side gears via the differential pinion gears.

The supplemental pinion pin 11 may have any suitable configuration, such as for example a configuration similar to the pinion pin 5. In the illustrated embodiment, the supplemental pinion pin 11 comprises a first pin section 12a and a second pin section 12b, as shown in for example FIGS. 3 and 4A-4C. The first pin section 12a and a second pin section 12b are connected by a pin section holder 13 for forming the structure of the supplemental pinion pin 11. The pin section holder 13 is connected to, or arranged in connection to, the pinion pin 5 and configured for positioning the first pin section 12a and the second pin section 12b on radially opposite sides of the pinion pin 5, as shown in FIGS. 4D-4E. The pinion pin 5 and the supplemental pinion pin 11 are with this configuration forming an X-like structure for rotatably holding the differential pinion gears.

The ring gear 2 comprises a first side wall 7a and a second side wall 7b arranged on opposite sides of the ring gear 2 in the axial direction $D_A$, as shown in FIGS. 3 and 4A-4F. Each of the first side wall 7a and the second side wall 7b is connecting the internal surface 2a and the external surface 2b.

Figure 3:
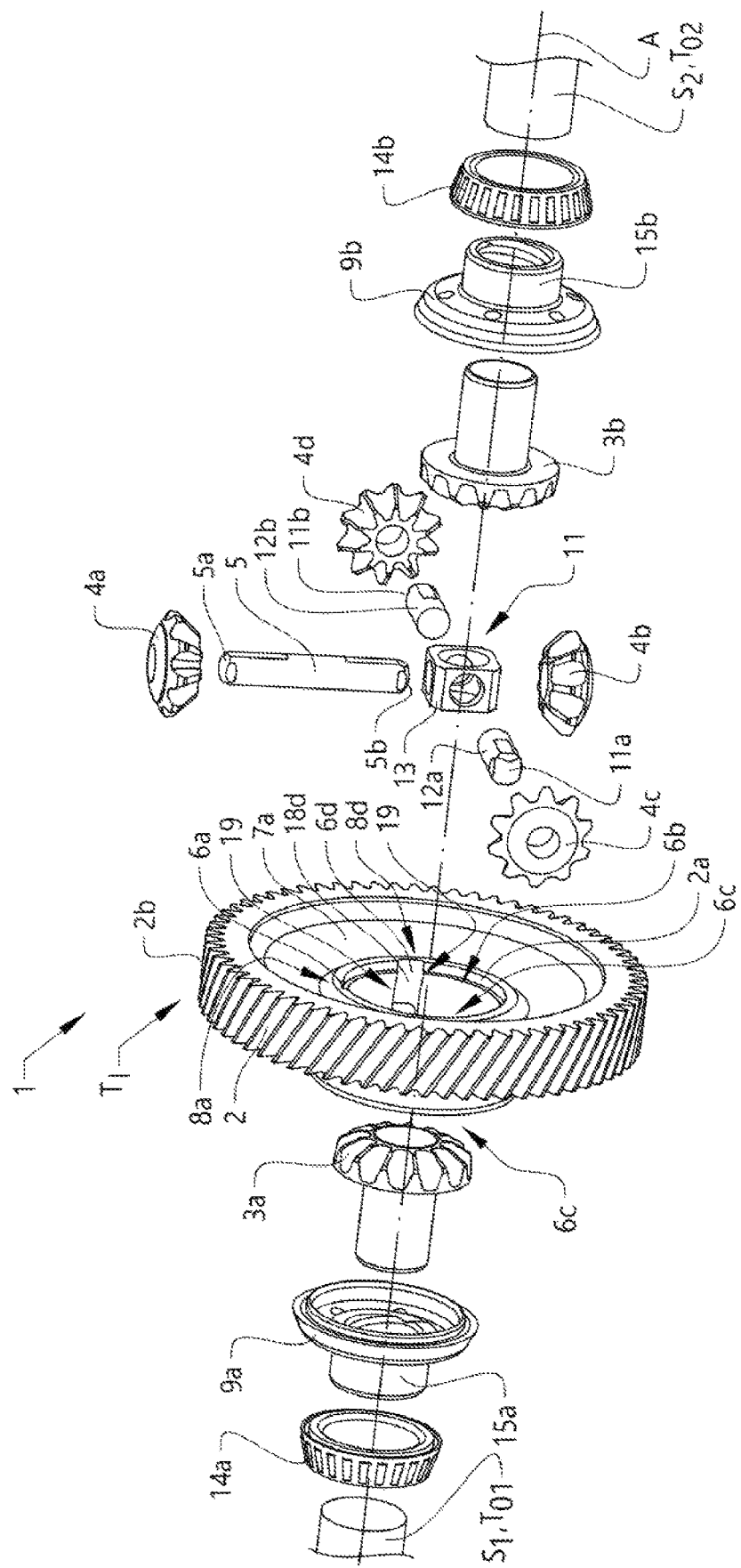
FIG. 3 shows in an exploded perspective view, a differential gear assembly according to an alternative embodiment of the disclosure.
Figure 4A:
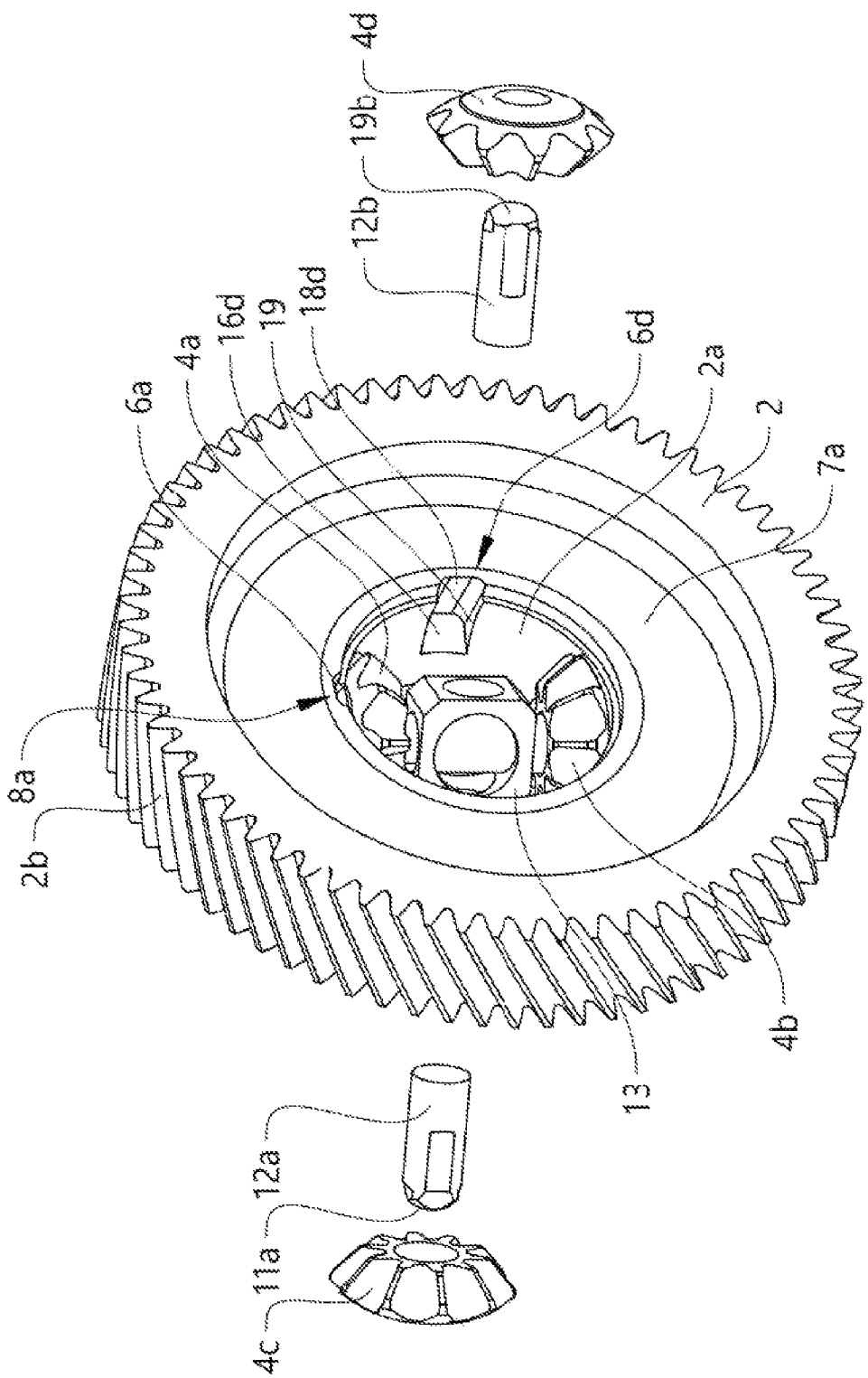
FIGS. 4A-4F show schematically in perspective views, cross-sectional side views, and exploded perspective views, the differential gear assembly according to the alternative embodiment of the disclosure.
Figure 4C:
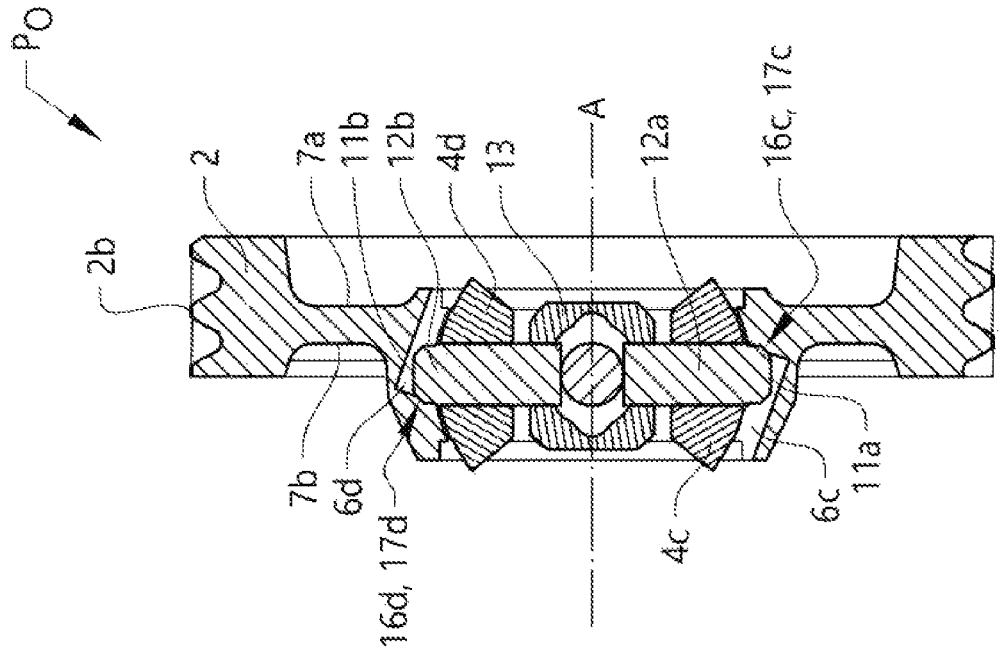
Figure 4B:
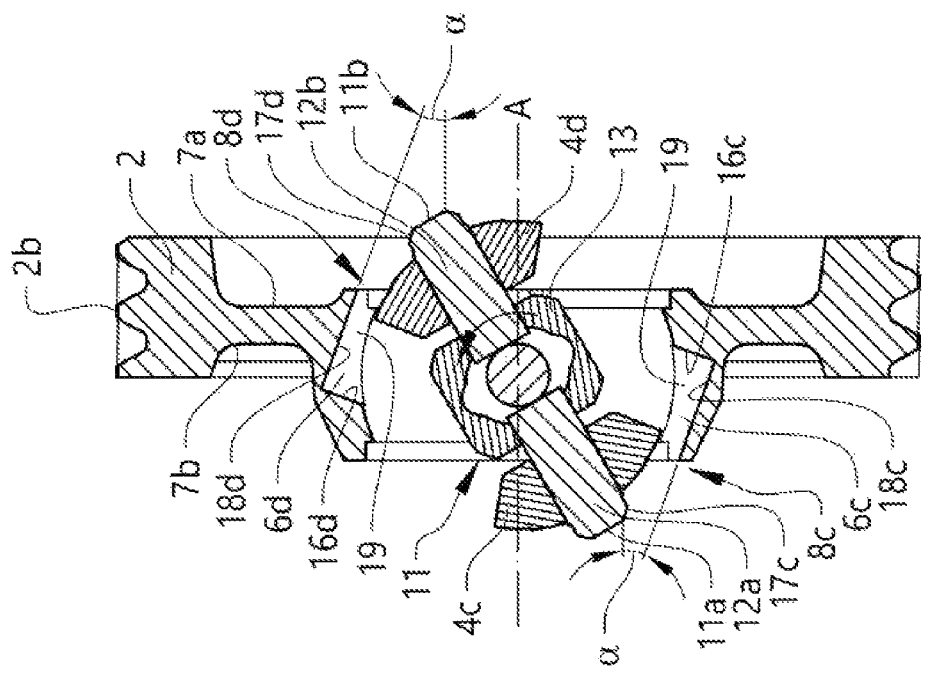
Figure 4D:
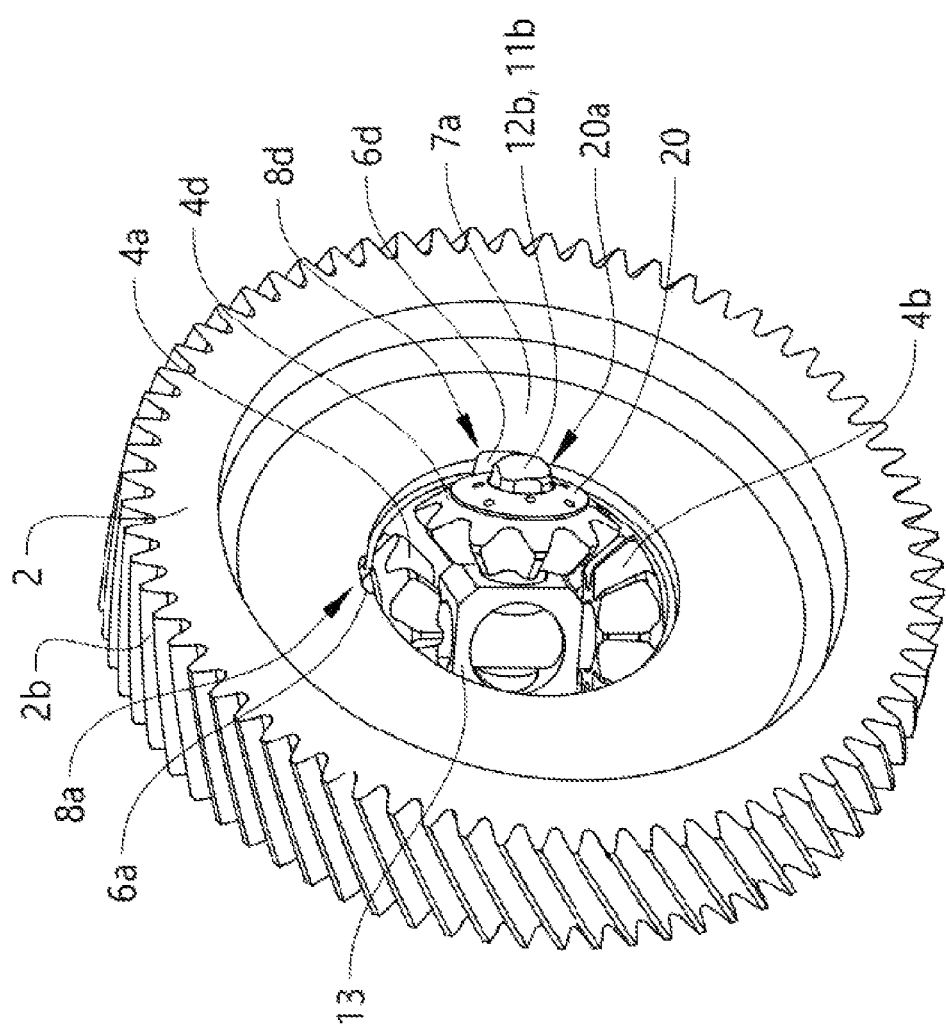
Figure 4E:
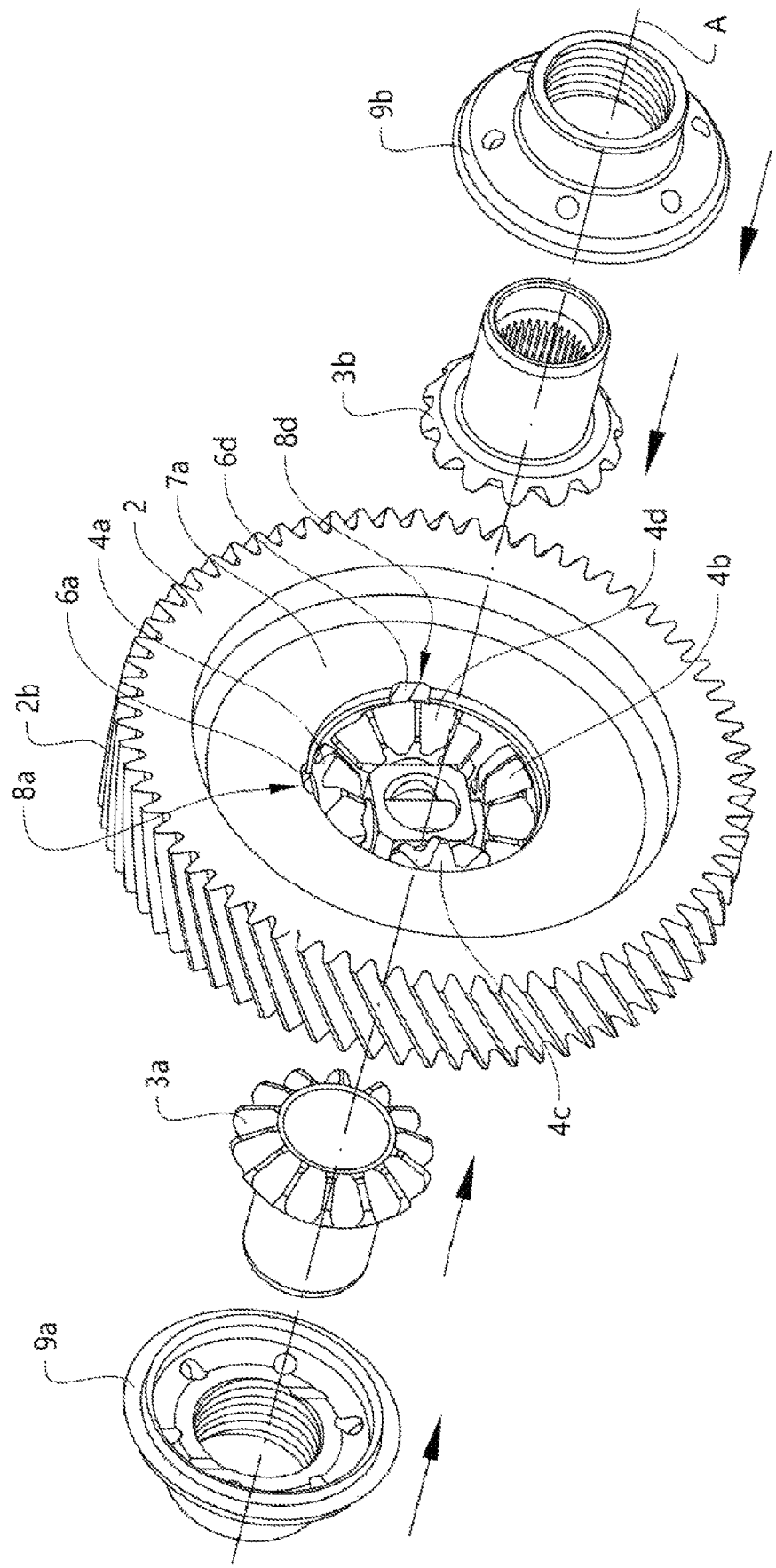

As illustrated in FIGS. 3 and 4A-4D, the ring gear 2 comprises a first slot 6a and a second slot 6b configured for receiving the pinion pin 5, and further a third slot 6c and a fourth slot 6d configured for receiving the supplemental pinion pin 11. The first slot 6a, the second slot 6b, the third slot 6c, and the fourth slot 6d, are arranged in connection to the internal surface 2a. The first slot 6a, the second slot 6b, the third slot 6c, and the fourth slot 6d, are extending partly through the ring gear 2 in the axial direction $D_A$, as best shown in FIGS. 4B-4C. The first slot 6a and the fourth slot 6d are extending in the axial direction $D_A$ from the first side wall 7a partly through the ring gear, where the extensions from the first side wall 7a are forming recesses in the material of the ring gear 2 in connection to the internal surface 2a. The second slot 6b and the third slot 6c are extending in the axial direction $D_A$ from the second side wall 7b partly through the ring gear, where the extensions from the second side wall 7b are forming recesses in the material of the ring gear 2 in connection to the internal surface 2a. As shown in the figures, the first slot 6a and the fourth slot 6d are arranged in connection to the interior surface 2a and the first side wall 7a. The second slot 6b and the third slot 6c are arranged in connection to the interior surface 2b and the second side wall 7b. The first slot 6a and the second slot 6b are arranged diametrically opposite each other with respect to the ring gear 2, in the same way as described in connection to the embodiment above and shown in FIGS. 2B-2C. The first slot 6a and the second slot 6b are thus spaced apart with an angle of 180° relative to the extension of the inner periphery of the ring gear 2 formed of the interior surface 2a. The third slot 6c and the fourth slot 6d are arranged diametrically opposite each other with respect to the ring gear 2, as shown in FIGS. 4B-4C. The third slot 6c and the fourth slot 6d are thus spaced apart with an angle of 180° relative to the extension of the inner periphery of the ring gear 2 formed of the interior surface 2a. In this way, the ring gear 2 comprises four slots spaced apart with an angle of 90° between two adjacent slots along the inner periphery.

The first slot 6a comprises a first slot opening 8a configured for receiving a first end 5a of the pinion pin 5, and the second slot 6b comprises a second slot opening 8b configured for receiving a second end 5b of the pinion pin 5, in the same way as in the embodiment above shown in FIGS. 2B-2C. The first slot opening 8a is arranged in connection to the first side wall 7a and the second slot opening 8b is arranged in connection to the second side wall 7b. The respective slot openings are thus configured for receiving corresponding ends of the pinion pin 5 for a simple assembly of the differential gear assembly 1.

In the same way as described in the embodiment above and shown in FIG. 2C, in the operating position $P_O$ of the differential gear assembly 1, the first end 5a is received in the first slot 6a and the second end 5b is received in the second slot 6b. The first slot 6a is arranged with a first inner stop surface 16a, which is in contact with the first end 5a in the operating position $P_O$, for a precise positioning of the pinion pin 5 relative to the ring gear 2. The first end 5a may be provided with a shaped first contact surface 17a that is configured with a shape corresponding to the first inner stop surface 16a for a secure positioning of the pinion pin 5 in relation to the ring gear 2. The second slot 6b is arranged with a second inner stop surface 16b, which is in contact with the second end 5b in the operating position $P_O$, for a precise positioning of the pinion pin 5 to the ring gear 2. The second end 5b may be provided with a shaped second contact surface 17b that is configured with a shape corresponding to the second inner stop surface 16b for a secure positioning of the pinion pin 5 in relation to the ring gear 2. The pinion pin 5 is when received in the first slot 6a and the second slot 6b in the operating position $P_O$ extending perpendicular to, or essentially perpendicular to, the axial direction $D_A$. The first slot 6a is further arranged with a first outer surface 18a, which in the operating position $P_O$ is limiting movement of the pinion pin 5 outwards in the radial direction. The first outer surface 18a is connecting the first slot opening 8a and the first inner stop surface 16a. The second slot 6b is further arranged with a second outer surface 18*b*, which in the operating position $P_O$ is limiting movement of the pinion pin 5 outwards in the radial direction. The second outer surface 18*b* is connecting the second slot opening 8*b* and the second inner stop surface 16*b*. Each slot is further arranged with two side surfaces 19 extending from the respective outer surfaces to the internal surface 2*a* of the ring gear 2. The side surfaces 19 are preventing unwanted movement of the pinion pin 5 in a direction along the inner periphery of the ring gear 2 in connection to the interior surface 2*a*. Suitably, each slot has a shape and dimension matching the shape and dimension of the corresponding end of the pinion pin 5 for a secure positioning and attachment of the pinion pin 5 relative to the ring gear 2 in the operating position $P_O$.

The third slot 6*c* comprises a third slot opening 8*c* configured for receiving a first end 11*a* of the supplemental pinion pin 11, and the fourth slot 6*d* comprises a fourth slot opening 8*d* configured for receiving a second end 11*b* of the supplemental pinion pin 11. The third slot opening 8*c* is arranged in connection to the second side wall 7*b* and the fourth slot opening 8*d* is arranged in connection to the first side wall 7*a*. The respective slot openings are thus configured for receiving corresponding ends of the supplemental pinion pin 11 for a simple assembly of the differential gear assembly 1.

As shown in FIG. 4C, in the operating position $P_O$ of the differential gear assembly 1, the first end 11*a* is received in the third slot 6*c* and the second end 11*b* is received in the fourth slot 6*d*. As shown in FIGS. 4B-4C, the third slot 6*c* is arranged with a third inner stop surface 16*c*, which is in contact with the first end 11*a* in the operating position $P_O$, for a precise positioning of the supplemental pinion pin 11 relative to the ring gear 2. The first end 11*a* may be provided with a shaped third contact surface 17*c* that is configured with a shape corresponding to the third inner stop surface 16*c* for a secure positioning of the supplemental pinion pin 11 in relation to the ring gear 2. The fourth slot 6*d* is arranged with a fourth inner stop surface 16*d*, which is in contact with the second end 11*b* in the operating position $P_O$, for a precise positioning of the supplemental pinion pin 11 to the ring gear 2. The second end 11*b* may be provided with a shaped fourth contact surface 17*d* that is configured with a shape corresponding to the fourth inner stop surface 16*d* for a secure positioning of the supplemental pinion pin 11 in relation to the ring gear 2. The supplemental pinion pin 11 is when received in the third slot 6*c* and the fourth slot 6*d* in the operating position $P_O$ extending perpendicular to, or essentially perpendicular to, the axial direction $D_A$, as shown in FIG. 4C. The third slot 6*c* is further arranged with a third outer surface 18*c*, which in the operating position $P_O$ is limiting movement of the supplemental pinion pin 11 outwards in the radial direction. The third outer surface 18*c* is connecting the third slot opening 8*c* and the third inner stop surface 16*c*. The fourth slot 6*d* is further arranged with a fourth outer surface 18*d*, which in the operating position $P_O$ is limiting movement of the supplemental pinion pin 11 outwards in the radial direction. The fourth outer surface 18*d* is connecting the fourth slot opening 8*d* and the fourth inner stop surface 16*d*. Each of the third slot 6*c* and fourth slot 6*d* is further arranged with two side surfaces 19 extending from the respective outer surfaces to the internal surface 2*a* of the ring gear 2, as indicated in FIGS. 4A-4C. The side surfaces 19 are preventing unwanted movement of the supplemental pinion pin 11 in a direction along the inner periphery of the ring gear 2 in connection to the interior surface 2*a*. Suitably, each slot has a shape and dimension matching the shape and dimension of the corresponding end of the supplemental pinion pin 11 for a secure positioning and attachment of the supplemental pinion pin 11 relative to the ring gear 2 in the operating position $P_O$.

For a simple and precise assembly and positioning of the pinion pin 5 relative to the ring gear 2, the first slot 6*a* and the second slot 6*b* have inclined configurations and arranged at a slot angle α in relation to the axial direction $D_A$, in the same way and with the same configuration as described in the embodiment above in connection to FIGS. 2B-2C. For a simple and precise assembly and positioning of the supplemental pinion pin 11 relative to the ring gear 2, the third slot 6*c* and the second slot 6*d* have inclined configurations and arranged at a slot angle α in relation to the axial direction $D_A$, as shown in FIGS. 4B-4C. The third slot 6*c* is arranged at a slot angle α relative to the axial direction $D_A$. The third outer surface 18*c* of the third slot 6*c* is configured as an inclined surface that is arranged at the slot angle α in relation to the axial direction $D_A$. The fourth slot 6*d* is in a similar way arranged at a slot angle α relative to the axial direction $D_A$. The fourth outer surface 18*d* of the fourth slot 6*b* is configured as an inclined surface that is arranged at the slot angle α in relation to the axial direction $D_A$. The respective outer surfaces may have a straight configuration, as illustrated in FIGS. 4B-4C, or alternatively a curved or arced configuration, depending on the design of the differential gear assembly 1. In the latter case, where the outer surfaces are having curved or arced configurations, the slot angle α may be determined as the angle between the axial direction $D_A$ and the tangential line to the outer surfaces at the slot openings. With the curved or arced configurations, the arc radius needs to be slightly larger than the radial extension of the pinion pin 5 and the supplemental pinion pin 11.

Figure 4F:
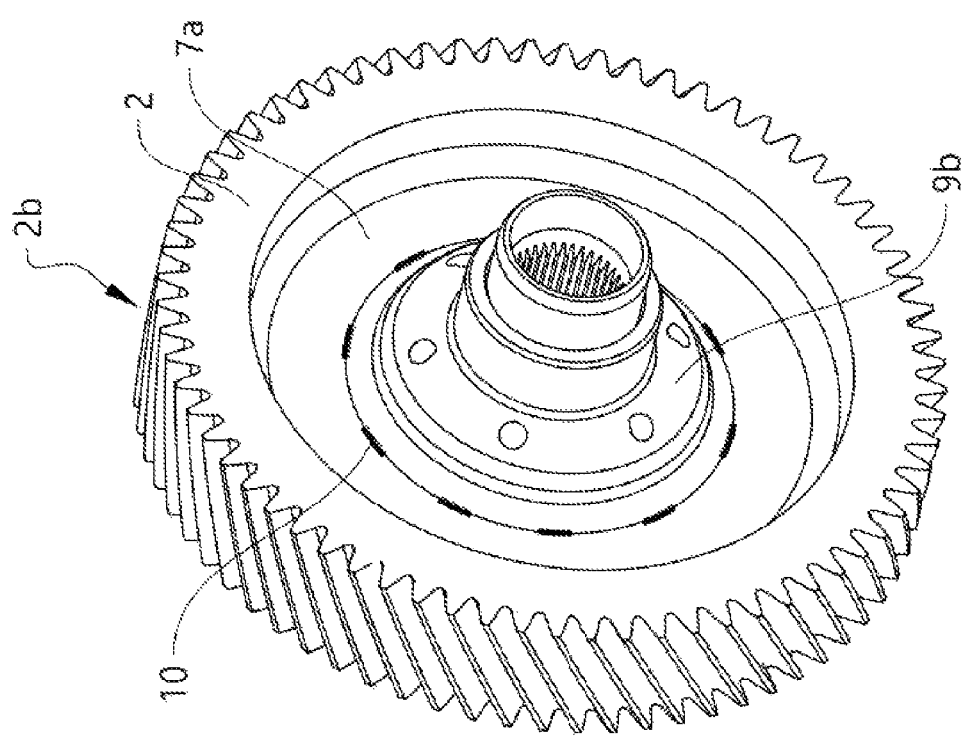

As shown in FIGS. 3 and 4E-4F, the differential gear assembly 1 further comprises a first bearing flange 9*a* arranged in connection to the second side wall 7*b* and a second bearing flange 9*b* arranged in connection to the first side wall 7*a*. The first bearing flange 9*a*, the second bearing flange 9*b*, and the interior surface 2*a* of the ring gear 2, are configured for enclosing the first side gear 3*a*, the second side gear 3*b*, the first differential pinion gear 4*a*, the second differential pinion gear 4*b*, the third differential pinion gear 4*c*, and the fourth differential pinion gear 4*d*. The bearing flanges are arranged as cover structures for keeping lubrication in place and for holding bearings. The bearing flanges are further used for holding the pinion pin and the supplemental pinion pin in position in relation to the slots. The first bearing flange 9*a* and the second bearing flange 9*b* may have any suitable configuration, and each bearing flange may be provided with one or more seals in connection to its corresponding side gear. The first bearing flange 9*a* and the second bearing flange 9*b* are suitably symmetrical in shape for a cost efficient and simple construction of the differential gear assembly 1. As shown in FIG. 3, the first bearing flange 9*a* is arranged with a first bearing surface 15*a* for holding a first bearing 14*a*. The second bearing flange 9*b* is arranged with a second bearing surface 15*b* for holding a second bearing 14*b*. Each of the first bearing flange 9*a* and the second bearing flange 9*b* is suitably connected to the ring gear 2 with one or more welds 10, as schematically illustrated in FIG. 4F. A steeper configuration of the slots with larger slot angles α may be used for enabling smaller outer diameters of the bearing flanges, as understood from the slot configuration illustrated in FIG. 4B. The bearing flanges should suitably cover the slot openings, as shown in FIG. 4F, and with a steeper slot configuration, the radial extensions of the slot openings may be decreased. Smaller outer diameters are enabling a more lightweight design of the bearing flanges.

To assemble parts of the differential gear assembly 1 of the alternative embodiment shown in FIGS. 3 and 4A-4F, the components and parts needed are provided from a suitable source. The first differential pinion gear 4a and the second differential pinion gear 4b are rotatably arranged on respective ends of the pinion pin 5, with the pin section holder 13 arranged between the first differential pinion gear 4a and the second differential pinion gear 4b, in a similar way as described in the embodiment above in connection to FIG. 2A. As understood from FIG. 3, the pin section holder 13 is arranged with suitable openings for receiving the pinion pin 5 as well as the first pin section 12a and the second pin section 12b. Thereafter, the pinion pin 5 with the first differential pinion gear 4a, the second differential pinion gear 4b, and the pin section holder 13 is positioned inside the ring gear 2, in the same way as described in the embodiment above in connection to FIG. 2B. The pinion pin 5 with the first differential pinion gear 4a, the second differential pinion gear 4b, and the pin section holder 13 is rotated into the operating position $P_O$ in which the pinion pin 5 is received in the first slot 6a and the second slot 6b for a torque transferring engagement between the ring gear 2 and the pinion pin 5, as shown in FIG. 4A. The pinion pin 5 with the first differential pinion gear 4a, the second differential pinion gear 4b, and the pin section holder 13 is rotated from a mounting position to the operating position $P_O$.

Thereafter, the first pin section 12a and the second pin section 12b are connected to the pin section holder 13 into the position illustrated in FIG. 4B, where the third differential pinion gear 4c is rotatably arranged on the first pin section 12a and the fourth differential pinion gear 4d is rotatably arranged on the second pin section 12b. In this position, the supplemental pinion pin 11 with the third differential pinion gear 4c and the fourth differential pinion gear 4d is positioned inside the ring gear 2, as shown in FIG. 4B. The supplemental pinion pin 11 with the third differential pinion gear 4c and the fourth differential pinion gear 4d is rotated into the operating position $P_O$ in which the supplemental pinion pin 11 is received in the third slot 6c and the fourth slot 6d for a torque transferring engagement between the ring gear 2 and the supplemental pinion pin 11, as indicated with the arrow in FIG. 4B. The supplemental pinion pin 11 with the third differential pinion gear 4c and the fourth differential pinion gear 4d is thus in the illustrated embodiment rotated counter clockwise from the mounting position in FIG. 4B to the operating position $P_O$ in FIG. 4C.

When the pinion pin 5 with the first differential pinion gear 4a and the second differential pinion gear 4b, as well as the supplemental pinion pin 11 with the third differential pinion gear 4c, and the fourth differential pinion gear 4d, are mounted to the ring gear 2, the first side gear 3a and the second side gear 3b are assembled into the differential gear assembly 1 in positions where the first side gear 3a and the second side gear 3b are in engagement with the first differential pinion gear 4a, the second differential pinion gear 4b, the third differential pinion gear 4c, and the fourth differential pinion gear 4d, as indicated with arrows in FIG. 4E. The first bearing flange 9a and the second bearing flange 9b are assembled with the first side gear 3a and the second side gear 3b, as indicated with arrows in FIG. 4E to the fully assembled position in FIG. 4F. The first bearing flange 9a and the second bearing flange 9b are thereafter welded to the ring gear 2 with one or more welds 10 as shown in FIG. 4F.

In the different embodiments, the pinion pin, or alternatively the pinion pin 5 and the supplemental pinion pin 11, may be arranged with washer structures 20 in connection to the respective ends, as shown in FIGS. 5A-5B. In FIGS. 2A and 4D, the washer structures are schematically shown for illustrative purposes. It should be understood that the differential gear assembly 1 could be arranged with the washer structures 20 or alternatively without the washer structures 20, depending on the design and construction of the assembly.

The first end 5a and the second end 5b of the pinion pin 5 may each be arranged with the washer structure 20 positioned radially outside its corresponding differential pinion pin, as shown in FIGS. 5A-5B. Each of the first end 5a and second end 5b of the pinion pin 5 is suitably provided with an end structure 21 having a step-like configuration with a smaller diameter than the rest of the pinion pin 5, as understood from FIG. 5A, and each of the washer structures 20 is provided with a washer opening 20a having a size corresponding to the end structure 21. The washer opening 20a is positioned on the end structure 21 for holding the washer structure 20 in position in relation to the pinion pin 5. The washer structures 20 arranged at each end of the pinion pin 5 are having a restraining function preventing movement of the pinion pin in relation to the ring gear 2 in an axial direction of the pinion pin 5.

The first end 11a and the second end 11b of the supplemental pinion pin 11 may each be arranged with the washer structure 20 positioned radially outside its corresponding differential pinion pin, as shown in FIGS. 5A-5B. Each of the first end 11a and second end 11b of the supplemental pinion pin 11 is suitably provided with an end structure 21 having a step-like configuration with a smaller diameter than the rest of the supplemental pinion pin 11, as understood from FIG. 5A, and each of the washer structures 20 is provided with a washer opening 20a having a size corresponding to the end structure 21. The washer opening 20a is positioned on the end structure 21 for holding the washer structure 20 in position in relation to the supplemental pinion pin 11. The washer structures 20 arranged at each end of the supplemental pinion pin 11 are having a restraining function preventing movement of the pinion pin in relation to the ring gear 2 in an axial direction of the supplemental pinion pin 11.

With the washer structures 20, the inclined slots of the ring gear can be made with less precision through the restraining function of the washer structures 20.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Differential gear assembly
2: Ring gear
2a: Internal surface
2b: External surface
3a: First side gear
3b: Second side gear
4a: First differential pinion gear
4b: Second differential pinion gear
4c: Third differential pinion gear
4d: Fourth differential pinion gear
5: Pinion pin
5a: First end
5b: Second end
6a: First slot
6b: Second slot
6c: Third slot
6d: Fourth slot
7a: First side wall
7b: Second side wall
8a: First slot opening
8b: Second slot opening
8c: Third slot opening
8d: Fourth slot opening
9a: First bearing flange
9b: Second bearing flange
10: Weld
11: Supplemental pinion pin
11a: First end
11b: Second end
12a: First pin section
12b: Second pin section
13: Pin section holder
14a: First bearing
14b: Second bearing
15a: First bearing surface
15b: Second bearing surface
16: Inner stop surface
17: Contact surface
18: Outer surface
19: Side surface
20: Washer structure
20a: Washer opening
21: End structure
A: Rotational axis
α: Slot angle
$D_A$: Axial direction
$P_O$: Operating position
$S_1$: First drive shaft
$S_2$: Second drive shaft
$T_1$: Input torque
$T_{O1}$: First output torque
$T_{O2}$: Second output torque

What is claimed is:

1. A differential gear assembly for a vehicle, wherein the differential gear assembly comprises:
   an annular ring gear having an internal surface and an external surface, wherein the ring gear is arranged to rotate around a rotational axis extending in an axial direction;
   a first side gear configured for distributing a first output torque to a first drive shaft, and a second side gear configured for distributing a second output torque to a second drive shaft;
   a first differential pinion gear and a second differential pinion gear, wherein the first differential pinion gear and the second differential pinion gear are configured for engaging the first side gear and the second side gear;
   a pinion pin extending diametrically across the ring gear, wherein the first differential pinion gear and the second differential pinion gear are rotatably arranged on the pinion pin,
   wherein the ring gear comprises a first slot and a second slot configured for receiving the pinion pin, wherein the first slot and the second slot are arranged in connection to the internal surface and are extending partly through the ring gear in the axial direction,
   wherein the ring gear comprises a first side wall and a second side wall arranged on opposite sides of the ring gear in the axial direction, wherein the first side wall and the second side wall each is connecting the internal surface and the external surface, wherein the first slot comprises a first slot opening configured for receiving a first end of the pinion pin, and the second slot comprises a second slot opening configured for receiving a second end of the pinion pin, wherein the first slot opening is arranged in connection to the first side wall and the second slot opening is arranged in connection to the second side wall, and
   wherein each slot has an inclined configuration and is arranged at a slot angle in relation to the axial direction.

2. The differential gear assembly according to claim 1, wherein the pinion pin when received in the first slot and the second slot in an operating position is extending perpendicular to the axial direction.

3. The differential gear assembly according to claim 1, wherein the differential gear assembly further comprises:
   a third differential pinion gear and a fourth differential pinion gear, wherein the third differential pinion gear and the fourth differential pinion gear are configured for engaging the first side gear and the second side gear; and
   a supplemental pinion pin extending diametrically across the ring gear, wherein the third differential pinion gear and the fourth differential pinion gear are rotatably arranged on the supplemental pinion pin,
   wherein the ring gear comprises a third slot and a fourth slot configured for receiving the supplemental pinion pin, wherein the third slot and the fourth slot are arranged in connection to the internal surface and are extending partly through the ring gear in the axial direction.

4. The differential gear assembly according to claim 3, wherein the third slot comprises a third slot opening configured for receiving a first end of the supplemental pinion pin, and the fourth slot comprises a fourth slot opening configured for receiving a second end of the supplemental pinion pin, wherein the third slot opening is arranged in connection to the second side wall and the fourth slot opening is arranged in connection to the first side wall.

5. The differential gear assembly according to claim 3, wherein the supplemental pinion pin when received in the third slot and the fourth slot in an operating position has an extension perpendicular to the axial direction.

6. The differential gear assembly according to claim 3, wherein the supplemental pinion pin comprises a first pin section and a second pin section connected by a pin section holder.

7. The differential gear assembly according to claim 6, wherein the pin section holder is connected to the pinion pin and configured for positioning the first pin section and the second pin section on radially opposite sides of the pinion pin.

8. The differential gear assembly according to claim 3, wherein the pinion pin and the supplemental pinion pin are configured for transferring input torque from the ring gear to the side gears via the differential pinion gears.

9. The differential gear assembly according to claim 1, wherein the differential gear assembly further comprises a first bearing flange arranged in connection to the second side wall and a second bearing flange arranged in connection to the first side wall, wherein the first bearing flange, the second bearing flange, and the interior surface, are configured for enclosing the side gears and the differential pinion gears.

10. The differential gear assembly according to claim 9, wherein the first bearing flange and the second bearing flange are symmetrical in shape.

11. The differential gear assembly according to claim 9, wherein the first bearing flange and the second bearing flange each is connected to the ring gear with one or more welds.

12. The differential gear assembly according to claim 1, wherein the side gears and the differential pinion gears are positioned radially inside the ring gear; wherein the pinion pin is configured for transferring input torque from the ring gear to the side gears via the differential pinion gears.

13. A vehicle comprising a differential gear assembly according to claim 1.

* * * * *